(12) United States Patent
Chang (10) Patent No.: US 10,595,043 B2
(45) Date of Patent: Mar. 17, 2020

(54) ENCODING METHOD AND ENCODING DEVICE FOR 3D VIDEO

(71) Applicant: Novatek Microelectronics Corp., Hsinchu (TW)

(72) Inventor: Yu-Wei Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1117 days.

(21) Appl. No.: 13/655,430

(22) Filed: Oct. 18, 2012

(65) Prior Publication Data
US 2014/0063184 A1     Mar. 6, 2014

(30) Foreign Application Priority Data
Aug. 30, 2012   (TW) .............................. 101131581 A (51) Int. Cl.
*H04N 13/00*  (2018.01)
*H04N 19/597*  (2014.01)

(52) U.S. Cl.
CPC ................. *H04N 19/597* (2014.11)

(58) Field of Classification Search
CPC ........ H04N 19/43; H04N 19/61; H04N 19/51; H04N 19/176; H04N 19/433; H04N 19/533; H04N 19/597; H04N 19/107; H04N 19/124; H04N 19/132
USPC ..................................... 348/43; 375/E07.125
See application file for complete search history.

(56) References Cited

U.S. PATENT DOCUMENTS 6,690,730 B2   2/2004  Choi
7,408,989 B2   8/2008  Rault et al.
8,526,502 B2   9/2013  Blume
9,036,082 B2   5/2015  Blume
2001/0028681 A1  10/2001  Choi
(Continued)

FOREIGN PATENT DOCUMENTS

CN   1316856   10/2001
CN   1615027   5/2005
(Continued)

OTHER PUBLICATIONS

Li et al. "A New Three-Step Search algorithm for block motion estimation", IEEE Trans. on Circuits and Systems for Video Technology, Aug. 1994, pp. 438-442.
(Continued)

*Primary Examiner* — Masum Billah
(74) *Attorney, Agent, or Firm* — JCIPRNET (57) ABSTRACT

An encoding method and an encoding device for 3D video are provided. The method includes the following. Pixel data of a first macro block in a first frame to be encoded is loaded, wherein the first frame belongs to a first view angle. Pixel data of a search window in a reference frame is loaded. A first motion estimation is executed according to the pixel data of the search window and the first macro block. Pixel data of a second macro block in a second frame to be encoded is loaded, wherein the second frame belongs to a second view angle different from the first view angle. A second motion estimation is executed according to the pixel data of the search window and the second macro block, thereby sharing the pixel data of the search window with the first motion estimation. Accordingly, the demand for a memory bandwidth is decreased.

17 Claims, 10 Drawing Sheets

(56) References Cited

U.S. PATENT DOCUMENTS

| | | | | |
|---|---|---|---|---|
| 2003/0067986 | A1* | 4/2003 | Yoon | H04N 5/145 |
| | | | | 375/240.16 |
| 2004/0141556 | A1* | 7/2004 | Rault | G06T 7/20 |
| | | | | 375/240.16 |
| 2005/0286635 | A1* | 12/2005 | Kumar | H04N 19/00151 |
| | | | | 375/240.16 |
| 2008/0204602 | A1 | 8/2008 | Beric et al. | |
| 2009/0097566 | A1* | 4/2009 | Huang | H04N 19/51 |
| | | | | 375/240.24 |
| 2010/0238355 | A1 | 9/2010 | Blume | |
| 2010/0271554 | A1 | 10/2010 | Blume | |
| 2010/0277644 | A1 | 11/2010 | Blume | |
| 2011/0044550 | A1 | 2/2011 | Tian et al. | |
| 2011/0205438 | A1 | 8/2011 | Blume | |
| 2011/0255597 | A1* | 10/2011 | Mihara | H04N 19/176 |
| | | | | 375/240.16 |
| 2011/0293012 | A1* | 12/2011 | Au | H04N 19/52 |
| | | | | 375/240.16 |
| 2012/0114036 | A1* | 5/2012 | Po | H04N 19/50 |
| | | | | 375/240.12 |
| 2012/0155543 | A1 | 6/2012 | Chen et al. | |

FOREIGN PATENT DOCUMENTS

| | | |
|---|---|---|
| CN | 101156450 | 4/2008 |
| CN | 101330614 | 12/2008 |
| CN | 101557519 | 10/2009 |
| CN | 101803361 | 8/2010 |
| CN | 102088610 | 6/2011 |
| CN | 102340662 | 2/2012 |
| EP | 0823826 | 12/2003 |
| KR | 20020023224 | 3/2002 |
| WO | 01/06794 | 1/2001 |

OTHER PUBLICATIONS

"Office Action of Taiwan Counterpart Application", dated May 20, 2015, p. 1-p. 4, in which the listed references were cited.

"Office Action of China Counterpart Application", dated Jun. 2, 2016, p. 1-p. 6, in which the listed reference was cited.

\* cited by examiner

ENCODING METHOD AND ENCODING DEVICE FOR 3D VIDEO

CROSS-REFERENCE TO RELATED APPLICATION

This application claims the priority benefit of Taiwan application serial no. 101131581, filed on Aug. 30, 2012. The entirety of the above-mentioned patent application is hereby incorporated by reference herein and made a part of this specification.

BACKGROUND OF THE INVENTION

Field of the Invention

The invention relates to an encoding method and an encoding device for a 3D (3-dimensional) video.

Description of Related Art

Generally speaking, when a 3D video is encoded or compressed, a reference frame is used to predict a current frame for finding temporal redundancy. The prediction can be achieved by executing a motion estimation, which is to find a reference macro block in a search window of the reference frame that most approximates a current macro block. The reference frame is usually stored in a memory. When the motion estimation needs to be executed, pixel data of the search window is correspondingly read from the memory. However, a frame of the 3D video may belong to one of multiple view angles, and thus the reference frame and the current frame may belong to the same view angle or different view angles. Otherwise, two reference frames are required for encoding one current frame, and one of the two reference frames belongs to the same view angle as the current frame while the other does not. That is to say, when the 3D video is encoded, pixel data of the reference frames belonging to different view angles are read from the memory, which increases the demand for a memory bandwidth. Therefore, how to reduce the demand for the memory bandwidth has become an important issue to researchers in this field.

SUMMARY

The embodiments of the invention provide an encoding method and an encoding device for a 3D video for reducing the demand for a memory bandwidth.

An embodiment of the invention provides an encoding method of a 3D video, adapted for an encoding device. The encoding method includes: loading pixel data of a first macro block in a first frame that is to be encoded, wherein the first frame belongs to a first view angle; loading pixel data of a first search window in a first reference frame; executing a first motion estimation according to the pixel data of the first search window and the first macro block; loading pixel data of a second macro block in a second frame that is to be encoded, wherein the second frame belongs to a second view angle different from the first view angle; and executing a second motion estimation according to the pixel data of the first search window and the second macro block, thereby sharing the pixel data of the first search window with the first motion estimation.

In an embodiment, a position of the first macro block in the first frame is consistent with a position of the second macro block in the second frame.

In an embodiment, the first reference frame belongs to one of the first view angle and the second view angle.

In an embodiment, one of the first frame and the second frame, which belongs to the same view angle as the first reference frame, is adjacent to the first reference frame.

In an embodiment, one of the first frame and the second frame, which belongs to the same view angle as the first reference frame, is separated from the first reference frame by at least one frame.

In an embodiment, after one of the first macro block and the second macro block is loaded, the other of the first macro block and the second macro block is loaded sequentially.

In an embodiment, after one of the first motion estimation and the second motion estimation is executed, the other of the first motion estimation and the second motion estimation is executed sequentially.

In an embodiment, the first motion estimation and the second motion estimation are executed simultaneously.

In an embodiment, the encoding method further includes: loading pixel data of a second search window in a second reference frame, wherein one of the first motion estimation and the second motion estimation is executed according to the pixel data of the second search window; loading a third macro block in a third frame that is to be encoded, wherein the third frame belongs to a third view angle different from the first view angle and the second view angle; and executing a third motion estimation according to the pixel data of the second search window and the third macro block, thereby sharing the pixel data of the second search window with one of the first motion estimation and the second motion estimation.

In an embodiment, the position of the first macro block in the first frame, the position of the second macro block in the second frame, and a position of the third macro block in the third frame are consistent with each other.

In an embodiment, the first reference frame belongs to one of the first view angle, the second view angle, and the third view angle; and the second reference frame belongs to another one of the first view angle, the second view angle, and the third view angle.

In an embodiment, after one of the first, second, and third macro blocks is loaded, another one of the first, second, and third macro blocks is loaded sequentially. After the another one of the first, second, and third macro blocks is loaded, the last one of the first, second, and third macro blocks is loaded sequentially.

In an embodiment, the encoding method further includes: loading the pixel data of the second search window in the second reference frame, wherein one of the first motion estimation and the second motion estimation is executed according to the pixel data of the second search window; loading the third macro block in the third frame that is to be encoded, wherein the third frame belongs to one of the first view angle and the second view angle; and executing the third motion estimation according to the pixel data of the first search window, the second search window, and the third macro block, thereby sharing the loaded pixel data of the first search window and the second search window with the first motion estimation or the second motion estimation.

In an embodiment, the position of the first macro block in the first frame, the position of the second macro block in the second frame, and the position of the third macro block in the third frame are consistent with each other.

In an embodiment, the first reference frame and the second reference frame belong to one of the first view angle and the second view angle.

In an embodiment, the encoding method further includes: loading pixel data of a third search window in a third reference frame, wherein the other one of the first motion estimation and the second motion estimation is executed according to the pixel data of the third search window.

In an embodiment, the first reference frame and the second reference frame belong to one of the first view angle and the second view angle; and the third reference frame belongs to the other one of the first view angle and the second view angle.

From another aspect, an embodiment of the invention provides an encoding device, including a memory and an encoder. The encoder is coupled to the memory for loading pixel data of a first macro block in a first frame that is to be encoded from the memory, wherein the first frame belongs to a first view angle. The encoder also loads pixel data of a first search window in a first reference frame from the memory and executes a first motion estimation according to the pixel data of the first search window and the first macro block. Moreover, the encoder loads pixel data of a second macro block in a second frame that is to be encoded. The second frame belongs to a second view angle different from the first view angle. The encoder further executes a second motion estimation according to the pixel data of the first search window and the second macro block, so as to share the loaded pixel data of the first search window with the first motion estimation.

In an embodiment, a position of the first macro block in the first frame is consistent with a position of the second macro block in the second frame.

In an embodiment, the first reference frame belongs to one of the first view angle and the second view angle.

In an embodiment, the encoder further loads pixel data of a second search window in a second reference frame from the memory, wherein one of the first motion estimation and the second motion estimation is executed according to the pixel data of the second search window. The encoder further loads a third macro block in a third frame that is to be encoded from the memory, wherein the third frame belongs to a third view angle different from the first view angle and the second view angle. The encoder further executes a third motion estimation according to the pixel data of the second search window and the third macro block, so as to share the loaded pixel data of the second search window with one of the first motion estimation and the second motion estimation.

In an embodiment, the encoder further loads the pixel data of the second search window in the second reference frame from the memory, wherein one of the first motion estimation and the second motion estimation is executed according to the pixel data of the second search window. The encoder further loads a third macro block in a third frame that is to be encoded from the memory, wherein the third frame belongs to one of the first view angle and the second view angle. The encoder further executes a third motion estimation according to the pixel data of the first search window, the second search window, and the third macro block, so as to share the loaded pixel data of the first search window and the second search window with the first motion estimation or the second motion estimation.

An embodiment of the invention provides an encoding method of a 3D video, adapted for an encoding device. The encoding method includes: loading pixel data of a first macro block in a first frame that is to be encoded, wherein the first frame belongs to a first view angle; loading pixel data of a first search window in a first reference frame; executing a first motion estimation according to the pixel data of the first search window and the first macro block; loading pixel data of a second macro block in a second frame that is to be encoded, wherein the second frame belongs to a second view angle different from the first view angle; loading pixel data of a non-overlapping area of a second search window in the first reference frame, wherein the non-overlapping area is non-overlapped with the first search window the second search window includes the non-overlapping area and an overlapping area with the first search window; and executing a second motion estimation according to the pixel data of the second search window and the second macro block, thereby sharing the pixel data of the overlapping area of the second search window and the first search window with the first motion estimation.

Based on the above, the embodiments of the invention provide the video encoding method and the encoding device, which allow two or more than two motion estimations to share the pixel data of one search window or the pixel data of the overlapping area of different search windows, thereby reducing the demand for memory bandwidth.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

First Embodiment

Figure 1:
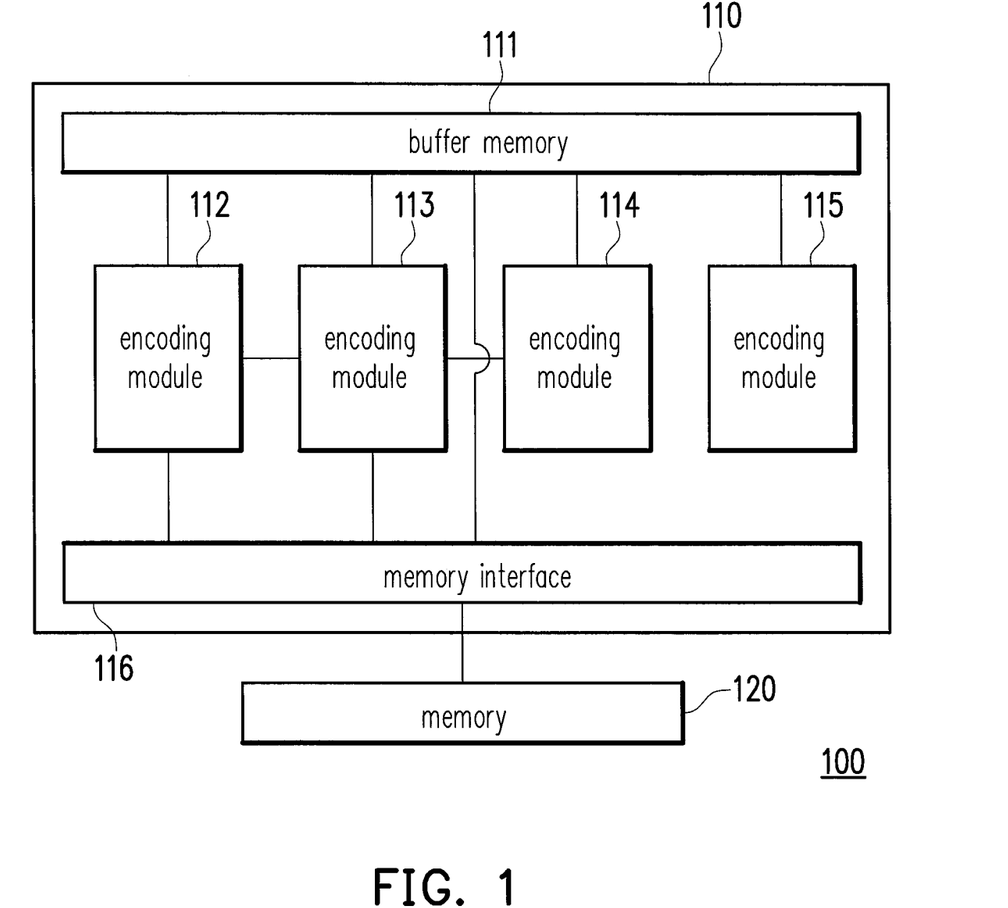
FIG. 1 is a block diagram illustrating an encoding device according to an embodiment of the invention.

FIG. 1 is a block diagram illustrating an encoding device according to an embodiment of the invention.

Referring to FIG. 1, an encoding device 100 is used for encoding or compressing a 3D video. The encoding device 100 includes an encoder 110 and a memory 120.

The memory 120 stores pixel data of a frame that is to be encoded and a reference frame.

The encoder 110 includes a buffer memory 111, a plurality of encoding modules such as encoding modules 112-115, and a memory interface 116. The memory interface 116 reads the pixel data in the frame that is to be encoded and the reference frame from the memory 120 and stores the same in the buffer memory 111. The encoding modules 112-115 process the frame that is to be encoded by a pipeline. For example, the encoding module 112 is used for executing a motion estimation, the encoding module 113 is used for executing an intra prediction, the encoding module 114 is used for executing a transform operation (e.g. discrete cosine transform (DCT)) and a quantization operation, and the encoding module 115 is used for executing an entropy coding.

In other embodiments, the encoder 110 may also be embodied as a pipeline with more or fewer stages. For example, the transform operation and the quantization operation may be divided into two stages, or the entropy coding may be divided into a binary operation and an arithmetic coding. The invention does not restrict the number of the stages of the pipeline in the encoder 110 (i.e. depth of the pipeline).

Figure 2A:
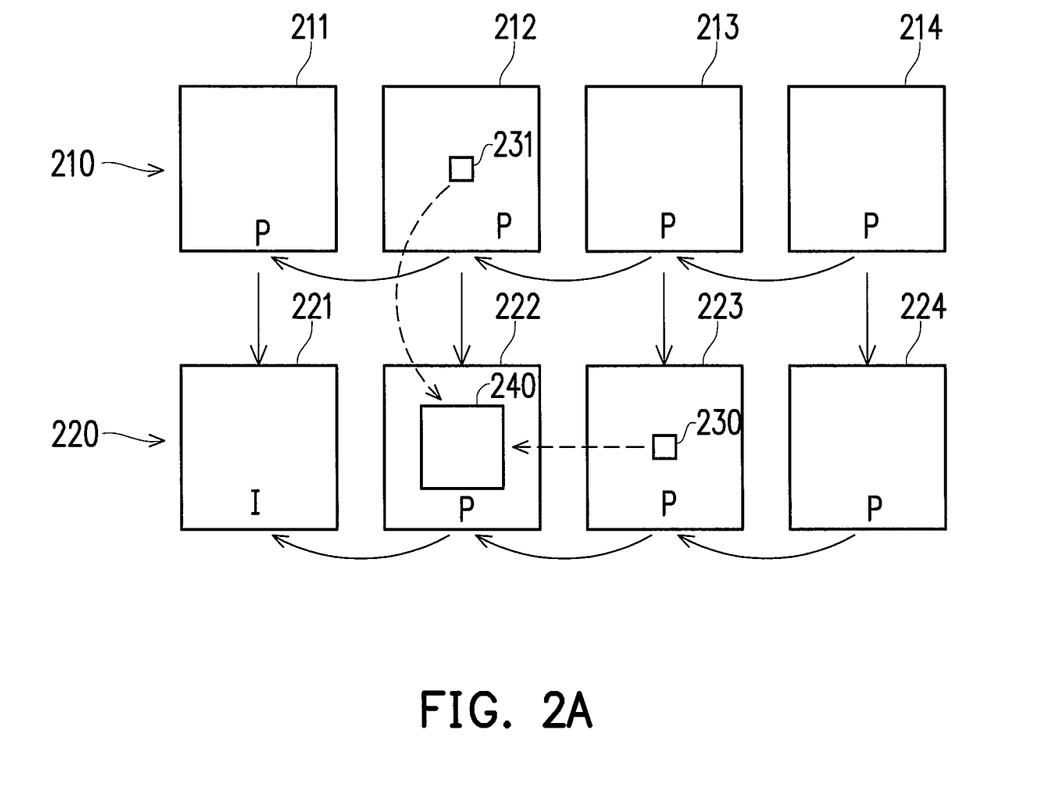
FIG. 2A and FIG. 2B illustrate an example of a 3D video according to an embodiment of the invention.
Figure 2B:
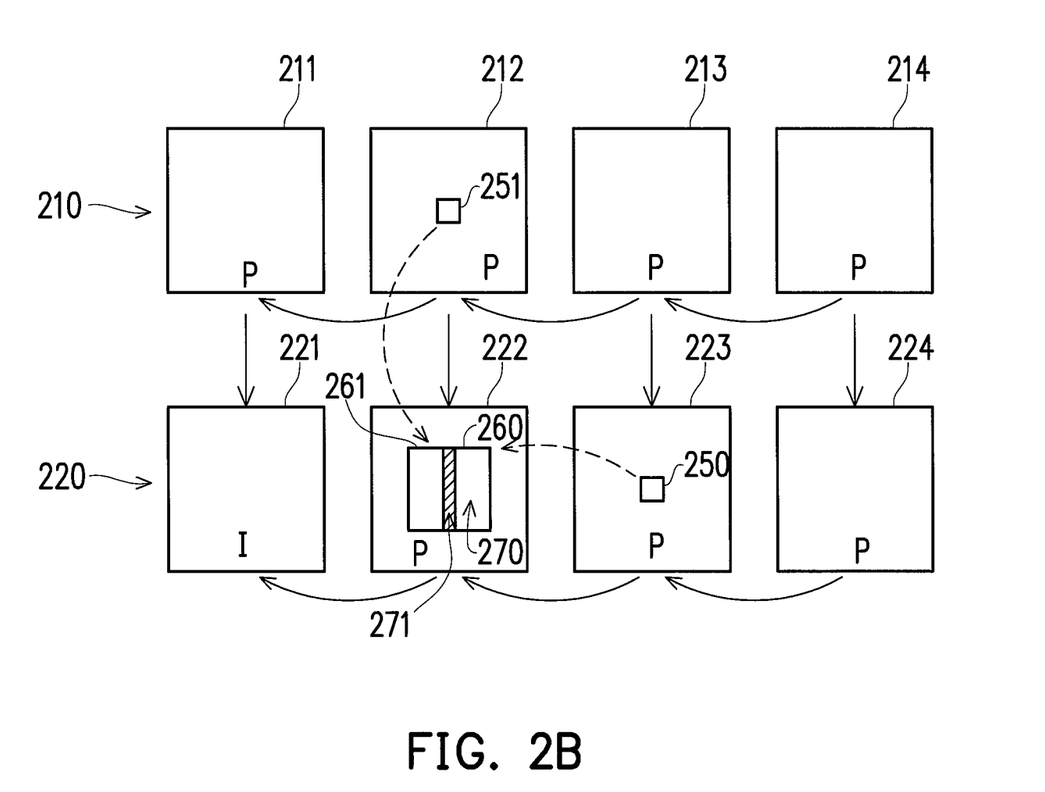

FIG. 2A and FIG. 2B illustrate an example of a 3D video according to an embodiment of the invention.

Referring to FIG. 2A, the 3D video includes frames 211-214 and 221-224. The frames 211-214 belong to a view angle 210, and the frames 221-224 belong to a view angle 220, which is different from the view angle 210. For instance, the frames 211-214 are captured by one video camera, and the frames 221-224 are captured by another video camera. The two video cameras capture the same view but are separated by a distance. A 3D video player may display the frames 211-214 to the left or right eye of a user and display the frames 221-224 to the other eye of the user, such that the user sees the 3D video. Therefore, the contents of the frames 211-214 are similar to the contents of the frames 221-224, so as it is possible to find a redundancy between the view angles by the motion estimation. The arrows in FIG. 2 indicate the dependency relationships. More specifically, the frame 221 is an I (intra) frame, which is compressed by the pixel data thereof. The frame 222 depends on the frame 221, that is to say, the pixel data of the frame 221 is used to predict the pixel data of the frame 222. Thus, the frame 222 is also called a P (prediction) frame. In other words, when the frame 222 is a frame to be encoded, the frame 221 is the reference frame for executing the motion estimation. Similarly, the frame 211 depends on the frame 221. Although the frame 211 and the frame 222 belong to different view angles, the frame 211 and the frame 222 both depend on the frame 221.

In the case that the frames 223 and 212 are the frames that are to be encoded, and the frame 222 is the corresponding reference frame, a macro block 230 in the frame 223 corresponds to a search window 240, and a macro block 231 in the frame 212 also corresponds to the search window 240. When the macro blocks 230 and 231 are encoded, the encoder 110 loads the pixel data of the macro blocks 230 and 231 and loads pixel data of the search window 240. The encoder 110 executes a motion estimation according to the pixel data of the macro block 230 and the search window 240. Regarding the execution of the motion estimation, various methods may be used. For example, the encoder 110 finds a reference block in the search window 240, which is similar to the macro block 230. The reference block is used for predicting the macro block 230. Therefore, the encoder 110 only needs to encode a residual between the reference block and the macro block. The encoder 110 of the invention may adopt any type of algorithm for motion estimation (e.g. diamond algorithm or hexagon search algorithm). The difference between the reference block and the macro block may be a SAD (sum of absolute difference) or a SATD (sum of absolute transformed difference), but the invention is not limited thereto. After executing the motion estimation, the encoder 110 obtains a shift value between the reference block and the macro block 230 as a motion vector. In addition, the difference between the reference block and the macro block 230 may be a minimum. It is noted that the aforementioned minimum refers to the minimum difference obtained according to one motion estimation algorithm. However, the found reference block may not have the minimum residual among all the reference blocks in the search window. In an embodiment, in order to find the reference block corresponding to the minimum difference, a full search algorithm is used, but the invention is not limited thereto.

Likewise, the encoder 110 further executes another motion estimation according to the pixel data of the macro block 231 and the search window 240. Similar to the motion estimation for the macro block 230, various methods are applicable for executing the motion estimation for the macro block 231. For example, a reference block is found in the search window 240, and then a shift value of the reference block and the macro block 231 is calculated as a motion vector, but the invention is not limited thereto.

It is noted that the aforementioned two motion estimations share the pixel data of the search window 240. In other words, after the pixel data of the search window 240 is loaded from the memory 120 to the encoder 110, the encoding module 112 executes two or more motion estimations according to the pixel data while the pixel data is stored in the encoder 110, so as to reduce the demand for a bandwidth of the memory 120.

Herein, "pixel data" may include a luminance value and/or a chroma value of a pixel in the frame. For example, the luminance value is a Y value in YCbCr gamut, and the chroma value is a Cb value or a Cr value. However, the luminance value and the chroma value may be in Lab gamut or other gamuts, and the invention is not limited to the above.

In an embodiment, a position of the macro block 230 in the frame 223 is consistent with a position of the macro block 231 in the frame 212. Therefore, the search window in the reference frame 222 corresponding to the macro block 230 completely matches the search window in the reference frame 222 corresponding to the macro block 231 (i.e. the search window 240). However, in another embodiment, the macro block 230 and the macro block 231 may be in different positions, and the two search windows corresponding to the macro block 230 and the macro block 231 in the reference frame 222 partially overlap each other.

With reference to FIG. 2B, in the embodiment shown in FIG. 2B, a macro block 250 corresponds to a search window 260, and a macro block 251 corresponds to a search window 261. The search window 260 and the search window 261 partially overlap each other. In other words, the search window 260 includes a non-overlapping area 270 and an overlapping area 271, and the overlapping area 271 overlaps the search window 261. Therefore, the motion estimation corresponding to the macro block 250 and the motion estimation corresponding to the macro block 251 share the pixel data of the overlapping area 271. More specifically, the encoder 110 loads the pixel data of the macro block 251 and the pixel data of the search window 261 and executes one motion estimation according to the pixel data of the search window 261 and the macro block 251. In addition, the encoder 110 loads the pixel data of the macro block 250 and the pixel data of the non-overlapping area 270 and executes another motion estimation according to the pixel data of the search window 260 and the macro block 250. According to the above, the pixel data of the overlapping area 271 is loaded only one time, and the two motion estimations share the pixel data of the overlapping area 271, thereby reducing the demand for the bandwidth of the memory 120.

Figure 3:
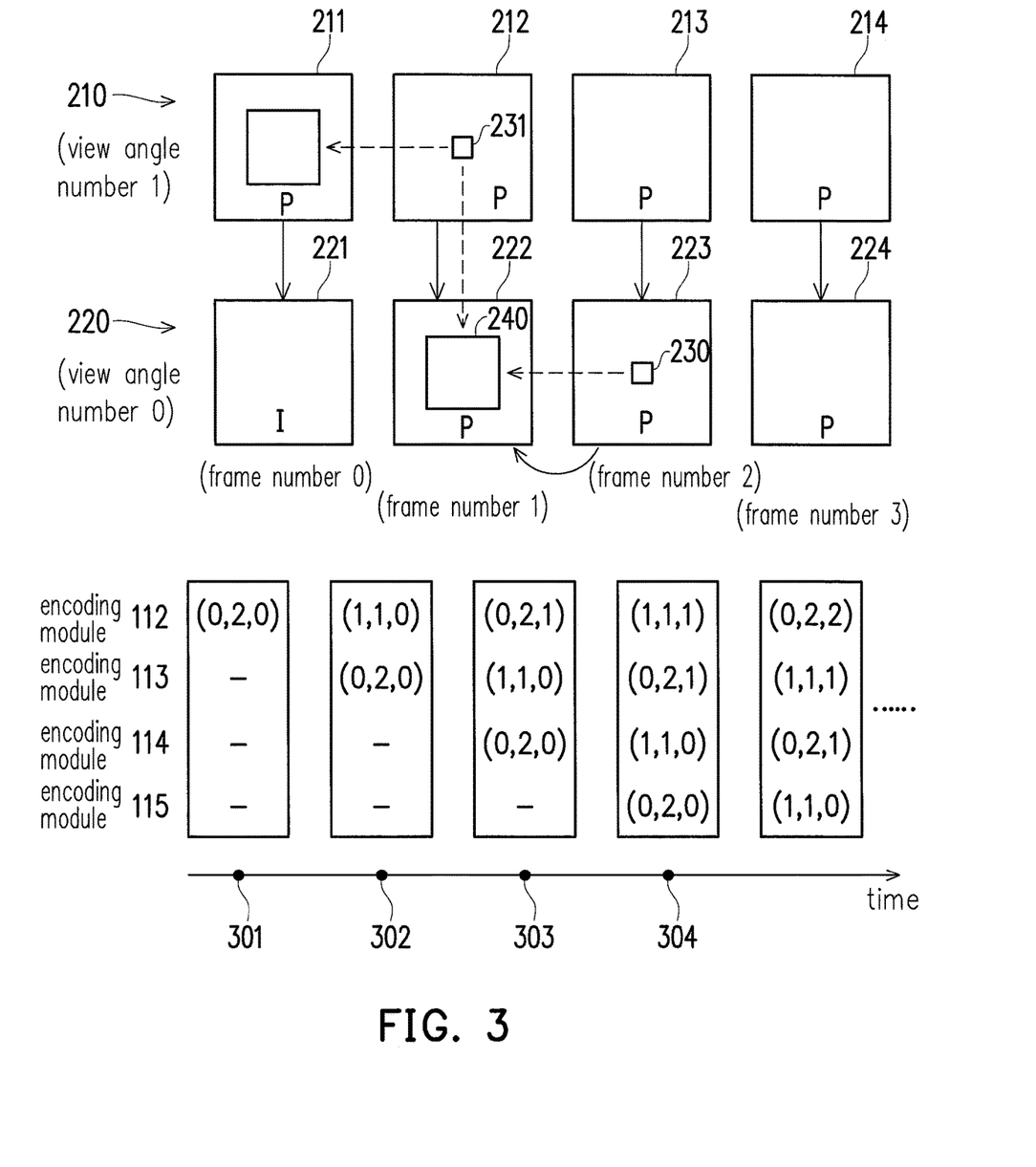
FIG. 3 illustrates an example of executing a motion estimation when two frames of different view angles depend on the same reference frame according to an embodiment of the invention.

FIG. 3 illustrates an example of executing a motion estimation when two frames of different view angles depend on the same reference frame according to an embodiment of the invention.

Referring to FIG. 3, the frames 223 and 212 are to be encoded. After one of the macro blocks 230 and 231 is loaded to the encoder 110, the other of the macro blocks 230 and 231 can be loaded sequentially. In addition, after one of the motion estimations corresponding to the macro blocks 230 and 231 is executed, the other of the motion estimations can be executed sequentially. That is to say, the encoder 110 may not execute the motion estimations for one macro block in the frame 223 and one macro block in the frame 212 at the same time.

To be more specific, in the following paragraphs, the position of one macro block is indicated by a vector (view angle number, frame number, and macro block number). Here the view angle 210 is denoted by "1", and the view angle 220 is denoted by "0". Moreover, the frame numbers of frames 211 and 221 are denoted by "0", the frame numbers of frames 212 and 222 are denoted by "1", the frame numbers of frames 213 and 223 are denoted by "2", and the frame numbers of frames 214 and 224 are denoted by "3". The macro block number denotes the position of one macro block in the frame. At a time point 301, the encoding module 112 executes the motion estimation for the macro block at (0,2,0). At a time point 302, the encoding module 112 executes the motion estimation for the macro block at (1,1,0). At a time point 303, the encoding module 112 executes the motion estimation for the macro block at (0,2,1). At a time point 304, the encoding module 112 executes the motion estimation for the macro block at (1,1,1). Therefore, the motion estimation executed for the macro block at (0,2,0) and the motion estimation executed for the macro block at (1,1,0) share the pixel data of one search window. In addition, the motion estimation executed for the macro block at (0,2,1) and the motion estimation executed for the macro block at (1,1,1) share the pixel data of one search window.

In the embodiment shown in FIG. 3, the frames 211-214 and the frames 221-224 are progressive frames, for example. However, in other embodiments, these frames may be other types of frames, such as interlaced frames (i.e., one interlaced frame can be divided into two fields, such as a top field and a bottom field). When the 3D video is encoded in the embodiment of FIG. 3, the two frames that are to be encoded belong to two different view angles (i.e. the view angles 210 and 220), and the view angle of the reference frame is one of the two view angles. However, in other embodiments, the view angle of the reference frame is not restricted to one of the two view angles. In addition, one of the two frames, which belongs to the same view angle as the reference frame, can be adjacent to the reference frame. For example, the frame 223 can be adjacent to the reference frame 222. However, other embodiments are not limited to the above. In other embodiments, for example, the two frames that are to be encoded may be separated by one or more frames, which will be explained in the embodiments with reference to FIG. 5 to FIG. 7.

In addition to alternately (i.e. sequentially or not at the same time) executing the motion estimations, the encoding device 100 is also adapted for simultaneously executing two or more than two motion estimations in parallel. More specifically, in another embodiment, the encoding device 100 further includes a plurality of encoding modules (i.e. second encoding modules). The number of the second encoding modules is the same as the number of the encoding modules 112-115, and the second encoding modules have the same functions as the encoding modules 112-115. When the encoding module 112 executes the motion estimation corresponding to the macro block 230, one of the second encoding modules simultaneously executes the motion estimation corresponding to the macro block 231. Moreover, the motion estimation executed by the second encoding module and the motion estimation executed by the encoding module 112 share the loaded pixel data. The second encoding modules may be disposed inside or outside the encoder 110. The invention does not restrict the positions of the second encoding modules.

Figure 4:
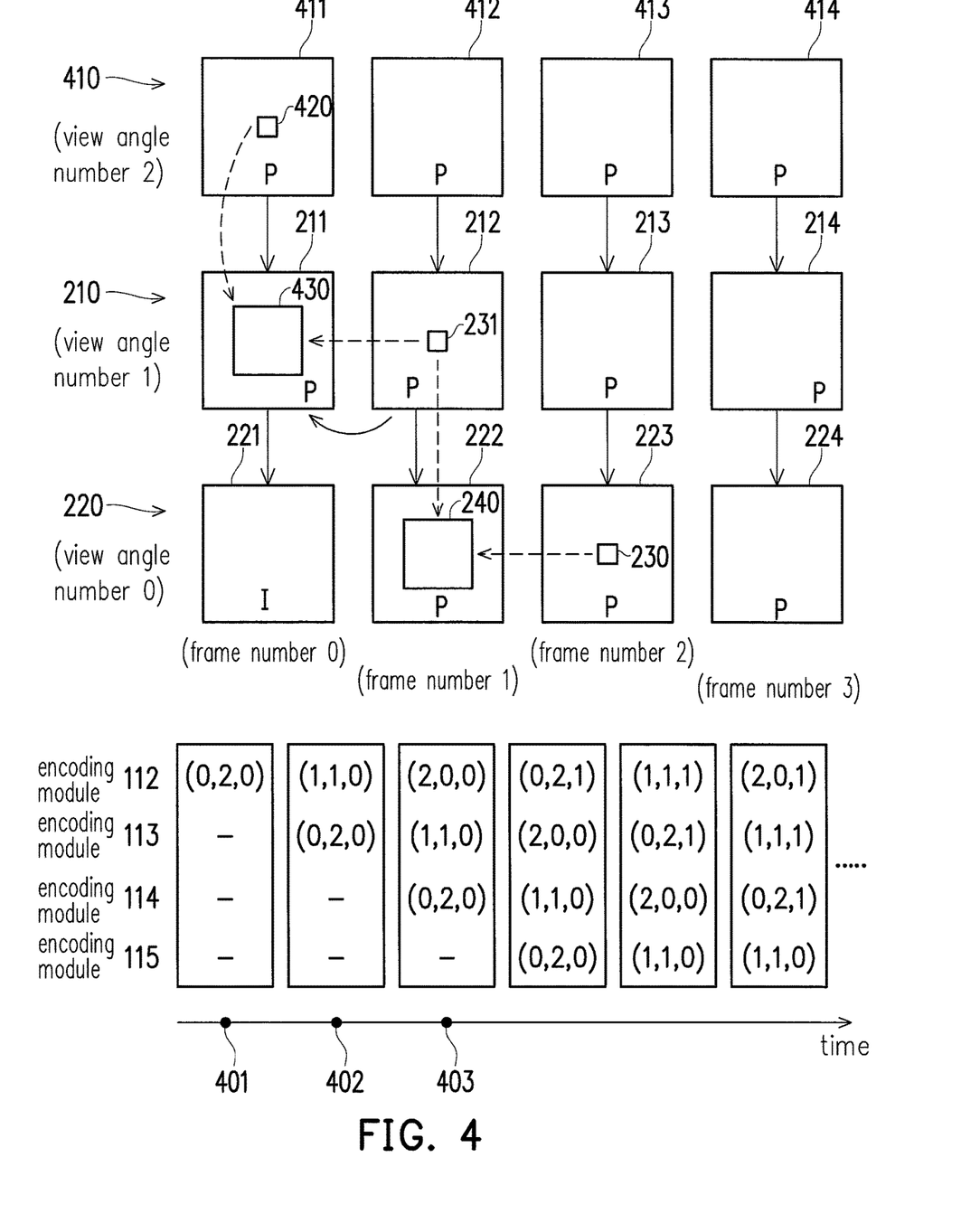
FIG. 4 illustrates an example of encoding a 3D video with three view angles according to an embodiment of the invention.

FIG. 4 illustrates an example of encoding a 3D video with three view angles according to an embodiment of the invention.

Referring to FIG. 4, frames 411-414 belong to a view angle 410, which is different from the view angles 210 and 220. The frames 411 and 212 depend on the frame 211. Specifically, the frames 223, 212, and 411 are to be encoded, and the frames 222 and 211 are reference frames. The macro block 231 and a macro block 420 correspond to a search window 430 in the reference frame 211. It is noted that FIG. 4 does not depict all the dependence relationships for simplification.

The encoder 110 not only loads the pixel data of the macro block 230, the macro block 231, and the search window 240 but also loads the pixel data of the search window 430. The motion estimation corresponding to the macro block 231 is also executed according to the search window 430. That is, when the motion estimation corresponding to the macro block 231 is executed, the encoding module 112 finds the pixel data that is most similar to the macro block 231 from the search window 240 and the search window 430. In addition, the encoder 110 loads the pixel data of the macro block 420 and executes the motion estimation according to the pixel data of the macro block 420 and the search window 430. It is noted that the motion estimation corresponding to the macro block 420 and the motion estimation corresponding to the macro block 231 share the pixel data of the search window 430. In other words, after the pixel data of the search window 430 is loaded to the encoder 110, the encoding module 112 executes the motion estimations corresponding to the macro blocks 420 and 231 while the pixel data is stored in the encoder 110. Thus, the pixel data in the reference frames 222 and 211 is shared, and the reference frames 222 and 211 belong to different view angles.

In the embodiment of FIG. 4, the position of the macro block 230 in the frame 223, the position of the macro block 231 in the frame 212, and the position of the macro block 420 in the frame 411 are consistent with each other. However, in another embodiment, the macro block 230 and the macro block 231 may be in different positions, and the two search windows corresponding to the macro block 230 and the macro block 231 in the reference frame 240 partially overlap each other; and/or the macro block 420 and the macro block 231 may be in different positions, and the two search windows corresponding to the macro block 420 and the macro block 231 in the reference frame 430 partially overlap each other. Accordingly, the motion estimations share the overlapping pixel data in the search windows to reduce the demand for the bandwidth of the memory 120.

Furthermore, the macro blocks 230, 231, and 420 are sequentially loaded to the encoder 110. That is to say, after one of the macro blocks 230, 231, and 420 is loaded to the encoder 110, another one of the macro blocks 230, 231, and 420 is then loaded. After the another one is loaded, the last one of the macro blocks 230, 231, and 420 is loaded.

Specifically, in the following paragraphs, the position of one macro block is indicated by a vector (view angle number, frame number, and macro block number). Hereinafter, the view angle 410 is denoted by "2". The frame number of frame 411 is denoted by "0", the frame number of frame 412 is denoted by "1", the frame number of frame 413 is denoted by "2", and the frame number of frame 414 is denoted by "3". At a time point 401, the encoding module 112 executes the motion estimation for the macro block at (0,2,0). At a time point 402, the encoding module 112 executes the motion estimation for the macro block at (1,1,0). At a time point 403, the encoding module 112 executes the motion estimation for the macro block at (2,0,0). Accordingly, the motion estimation executed for the macro block at (0,2,0) and the motion estimation executed for the macro block at (1,1,0) share the pixel data of one search window. The motion estimation executed for the macro block at (1,1,0) and the motion estimation executed for the macro block at (2,0,0) share the pixel data of one search window.

In the embodiment shown in FIG. 4, the frames 211-214, the frames 221-224, and the frames 411-414 are progressive frames, for example. However, in other embodiments, these may be other types of frames, such as interlaced frames (i.e., one interlaced frame can be divided into two fields such as a top field and a bottom field). Moreover, when the 3D video is encoded, the two frames that are to be encoded can belong to two different view angles (i.e. the view angles 210 and 220, or the view angles 410 and 210), and the view angle of the reference frame can be one of the two view angles. However, in other embodiments, the view angle of the reference frame is not restricted to one of the two view angles 210 and 220 (or the view angles 410 and 210). In addition, one of the two frames, which belongs to the same view angle as the reference frame, can be adjacent to the reference frame. For example, the frame 223 is adjacent to the reference frame 222, and the frame 212 is adjacent to the reference frame 211. However, other embodiments are not limited to the above. In other embodiments, for example, the two frames that are to be encoded may be separated by one or more frames.

The embodiment of FIG. 4 is similar to the embodiment of FIG. 3 that, in addition to alternately executing the motion estimations, the encoding device 100 is also adapted for simultaneously executing two or more than two motion estimations in parallel. More specifically, in another embodiment, the encoding device 100 further includes a plurality of encoding modules (i.e. second encoding modules). The number of the second encoding modules is the same as the number of the encoding modules 112-115, and the second encoding modules have the same functions as the encoding modules 112-115. When the encoding module 112 executes the motion estimation corresponding to the macro block 230, one of the second encoding modules simultaneously executes the motion estimation corresponding to the macro block 231. Moreover, the motion estimation executed by the second encoding module and the motion estimation executed by the encoding module 112 share the loaded pixel data. Similarly, when the encoding module 112 executes the motion estimation corresponding to the macro block 231, one of the second encoding modules simultaneously executes the motion estimation corresponding to the macro block 420. Furthermore, the motion estimation executed by the second encoding module and the motion estimation executed by the encoding module 112 share the loaded pixel data. The second encoding modules may be disposed inside or outside the encoder 110. The invention does not restrict the positions of the second encoding modules.

Second Embodiment

Figure 5:
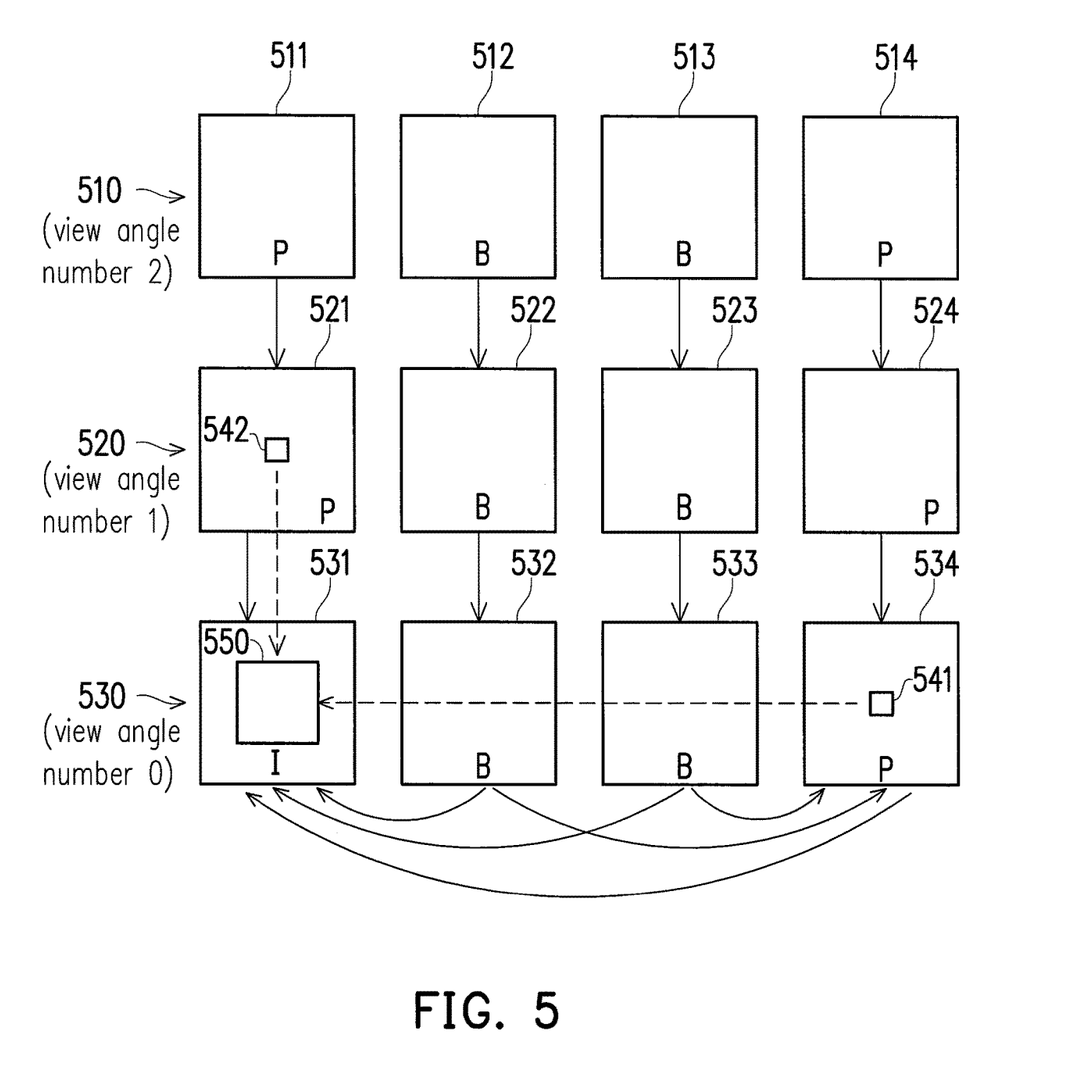
FIG. 5 to FIG. 7 illustrate an example of encoding a 3D video according to the second embodiment of the invention.
Figure 6:
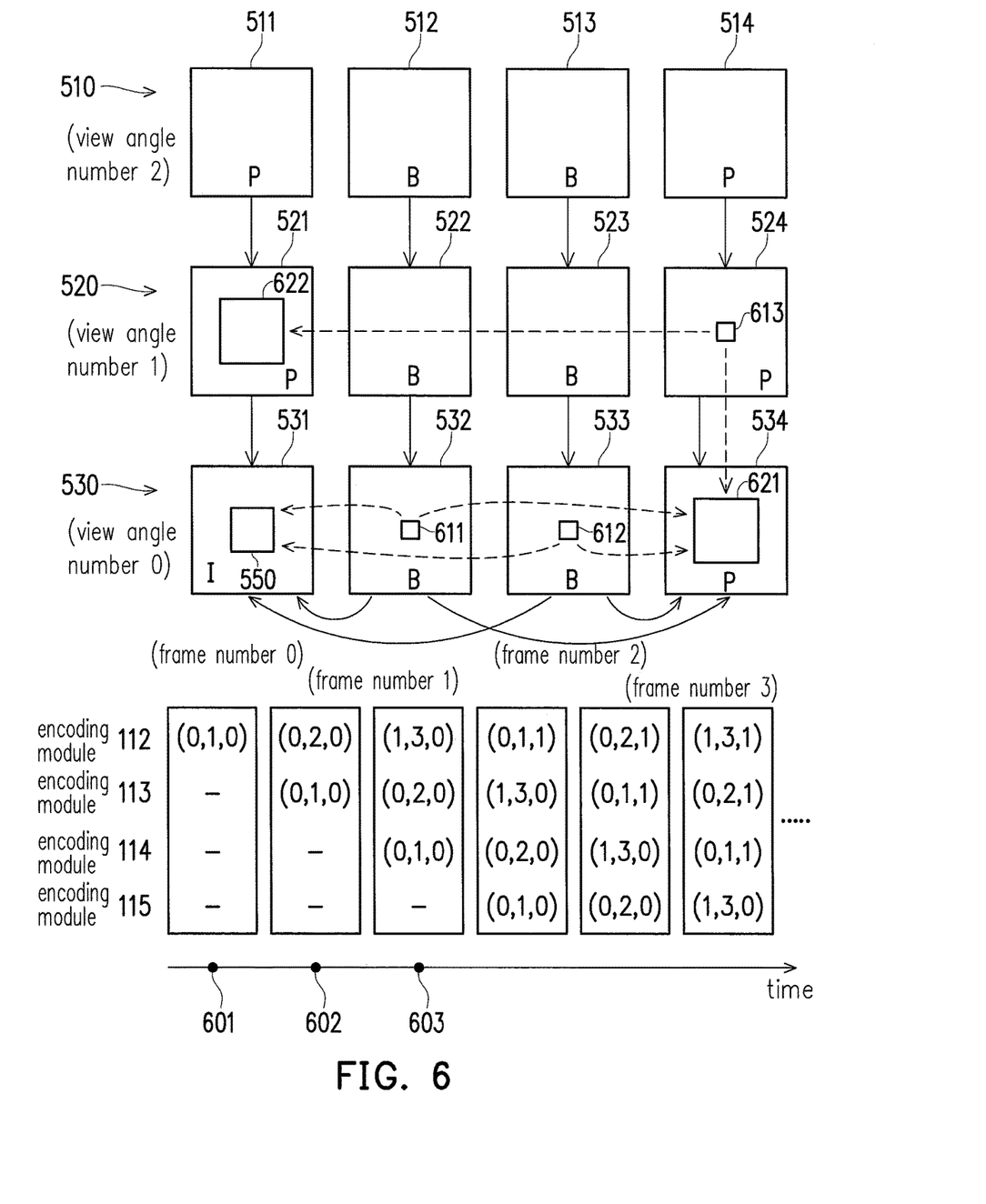
Figure 7:
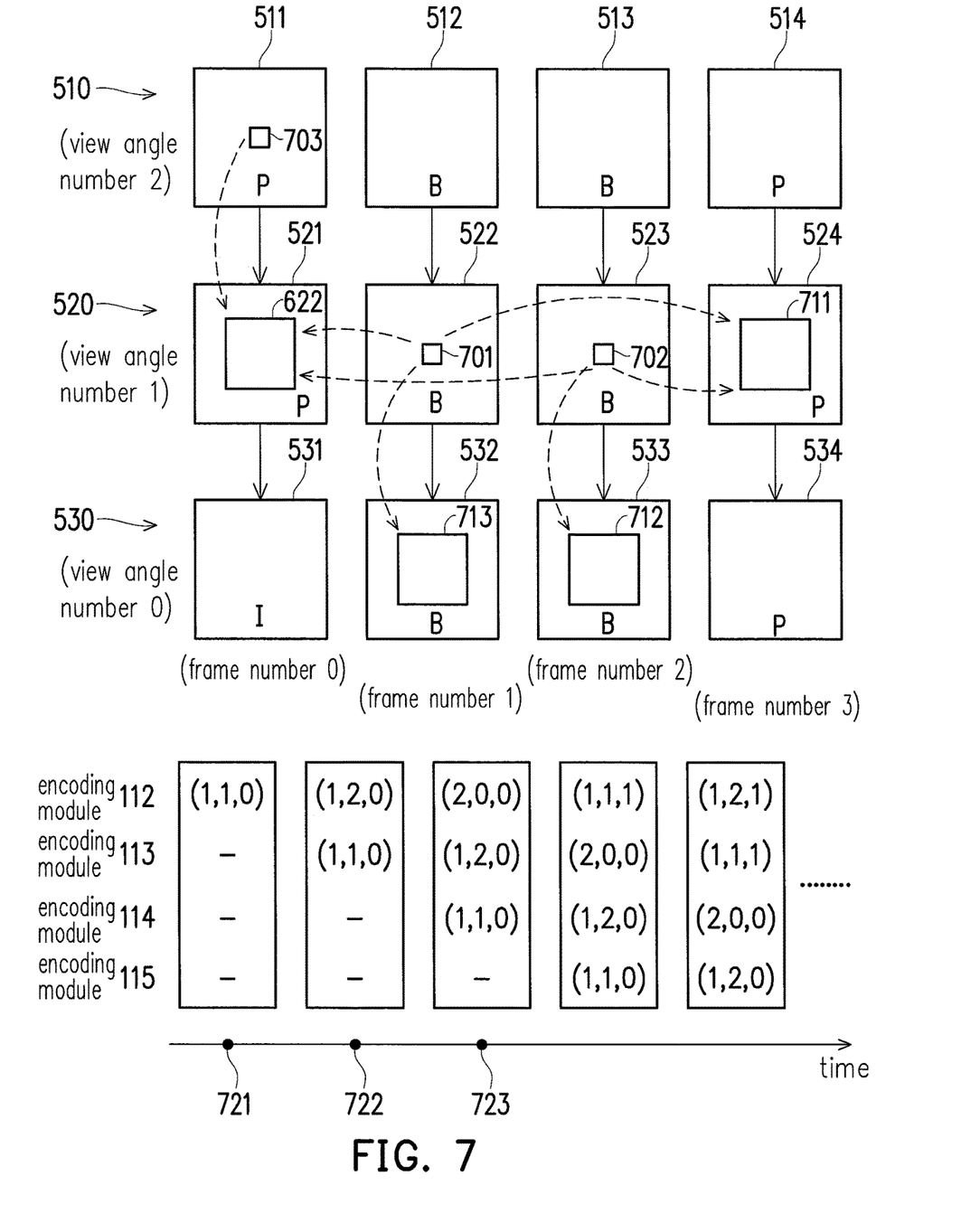

The second embodiment is similar to the first embodiment, and therefore only the difference is described hereinafter. FIG. 5 to FIG. 7 illustrate an example of encoding a 3D video according to the second embodiment of the invention.

Referring to FIG. 5, frames 511-514 belong to a view angle 510, frames 521-524 belong to a view angle 520, and frames 531-534 belong to a view angle 530. A difference between FIG. 5 and FIGS. 2-4 is that, when two frames that are to be encoded depend on one reference frame, one of the two frames, which belongs to the same view angle as the reference frame, is separated from the reference frame by at least one frame. For instance, the frames 534 and 521 depend on the frame 531, and thus the frames 534 and 521 are the frames to be encoded and the frame 531 is the corresponding reference frame. The frame 534 and the reference frame 531 belong to the same view angle and are separated by at least one frame. The encoding module 112 executes a motion estimation according to a search window 550 and the macro block 541, and executes another motion estimation according to the search window 550 and the macro block 542. The aforementioned two motion estimations share the pixel data of the search window 550. The sharing steps of this embodiment are similar to those of the first embodiment, and thus details are not repeated hereinafter.

With reference to FIG. 6, after the frames 534 and 521 are encoded (e.g. according to the embodiment of FIG. 5), the frames 532, 533, and 524 are the frames to be encoded, and the frames 521, 531, and 534 are the reference frames. The frames 532 and 533 depend on the reference frames 531 and 534; and the frame 524 depends on the reference frames 521 and 534. Because the frames 532 and 533 depend on two reference frames with the same view angle, the frames 532 and 533 are also called B (bi-directional) frames.

The encoder 110 loads pixel data of macro blocks 611-613, a search window 550, a search window 621, and a search window 622. The encoding module 112 executes a motion estimation according to the pixel data of the macro block 613, the search window 621, and the search window 622. The encoding module 112 further executes the motion estimation according to the pixel data of the macro block 612, the search window 621, and the search window 550. The encoding module 112 also executes the motion estimation according to the pixel data of the macro block 611, the search window 621, and the search window 550. Regarding the execution of the motion estimations for the macro blocks 611 and 612, various methods may be used. For example, the motion estimation for the macro block 611 is executed by respectively finding two reference blocks in the search windows 621 and 550 (wherein one reference block is in the search window 621 and the other reference block is in the search window 550) and then calculating the shift values of the two reference blocks with respect to the macro block 611 to obtain two motion vectors. The motion estimation for the macro block 612 is executed in the same way.

The position of the macro block 613 in the frame 524, the position of the macro block 612 in the frame 533, and the position of the macro block 611 in the frame 532 are consistent with each other. Therefore, the motion estimation corresponding to the macro block 611 and the motion estimation corresponding to the macro block 612 share the pixel data of the search windows 621 and 550. Besides, the motion estimation corresponding to the macro block 612 and the motion estimation corresponding to the macro block 613 share the pixel data of the search window 621. That is, the shared reference frames 534 and 531 belong to the same view angle 530.

Specifically, in the following paragraphs, the position of one macro block is indicated by a vector (view angle number, frame number, and macro block number). Here the view angle 510 is denoted by "2", the view angle 520 is denoted by "1", and the view angle 530 is denoted by "0". The frame numbers of frames 511, 521, and 531 are denoted by "0". The frame numbers of frames 512, 522, and 532 are denoted by "1". The frame numbers of frames 513, 523, and 533 are denoted by "2". The frame numbers of frames 514, 524, and 534 are denoted by "3". At a time point 601, the encoding module 112 executes the motion estimation for the macro block at (0,1,0). At a time point 602, the encoding module 112 executes the motion estimation for the macro block at (0,2,0). At a time point 603, the encoding module 112 executes the motion estimation for the macro block at (1,3,0). Therefore, the motion estimation corresponding to the macro block at (0,1,0) and the motion estimation corresponding to the macro block at (0,2,0) share the pixel data of two search windows. The motion estimation corresponding to the macro block at (0,2,0) and the motion estimation corresponding to the macro block at (1,3,0) share the pixel data of one search window. Moreover, the motion estimation corresponding to the macro block at (0,1,0) and the motion estimation corresponding to the macro block at (1,3,0) share the pixel data of one search window.

Referring to FIG. 7, after the frames 524, 532, and 533 are encoded (e.g. according to the embodiment of FIG. 6), the frames 524, 532, and 533 are used as the reference frames. Here the frames 511, 522, and 523 are to be encoded. The encoder 110 loads the pixel data of macro blocks 701-703, search windows 711-713, and the search window 622. The encoding module 112 executes a motion estimation according to the pixel data of the macro block 701, the search window 711, the search window 713, and the search window 622. The encoding module 112 also executes a motion estimation according to the pixel data of the macro block 702, the search window 711, the search window 712, and the search window 622. For example, the motion estimation for the macro block 701 is executed by respectively finding two reference blocks in the search windows 622, 711, and 713 (wherein one reference block is in one of the search windows 622, 711, and 713; and the other reference block is in another one of the search windows 622, 711, and 713) and then calculating the shift values of the two reference blocks with respect to the macro block 701 to obtain two motion vectors. Furthermore, the encoding module 112 executes the motion estimation according to the pixel data of the macro block 703 and the search window 622. Likewise, the motion estimation is for example executed by finding a reference block in the search window 622 and then calculating a shift value of the reference block and the macro block 703 as a motion vector, but the invention is not limited thereto. Accordingly, the motion estimation corresponding to the macro block 701 and the motion estimation corresponding to the macro block 702 share the pixel data of the search windows 711 and 622. Besides, the motion estimation corresponding to the macro block 701 and the motion estimation corresponding to the macro block 703 share the pixel data of the search window 622.

To be more specific, at a time point 721, the encoding module 112 executes the motion estimation for the macro block at (1,1,0). At a time point 722, the encoding module 112 executes the motion estimation for the macro block at (1,2,0). At a time point 723, the encoding module 112 executes the motion estimation for the macro block at (2,0,0). Based on the above, the motion estimation corresponding to the macro block at (1,1,0) and the motion estimation corresponding to the macro block at (1,2,0) share the pixel data of two search windows. The motion estimation corresponding to the macro block at (1,2,0) and the motion estimation corresponding to the macro block at (2,0,0) share the pixel data of one search window. Moreover, the motion estimation corresponding to the macro block at (1,1,0) and the motion estimation corresponding to the macro block at (2,0,0) also share the pixel data of one search window.

It is noted that the motion estimation for the macro block 701 and the motion estimation for the macro block 702 respectively use three search windows in this embodiment, but the invention is not limited thereto. In other embodiments of the invention, more or fewer search windows may be used for the motion estimation. For instance, the motion estimation for the macro block 701 and the motion estimation for the macro block 702 respectively use only two search windows 622 and 211.

Additionally, it is noted that, the embodiment of FIGS. 5-7 is similar to the embodiments of FIG. 3 and FIG. 4 and is also applicable to the situation that two macro blocks are in different positions but the corresponding search windows in the same reference frame partially overlap each other. The motion estimations for the macro blocks still share the pixel data of the overlapping area of the search windows. Similarly, in the embodiment of FIGS. 5-7, the encoding device 100 may be adapted for simultaneously executing two or more than two motion estimations in parallel in addition to alternately executing the motion estimations.

Figure 8:
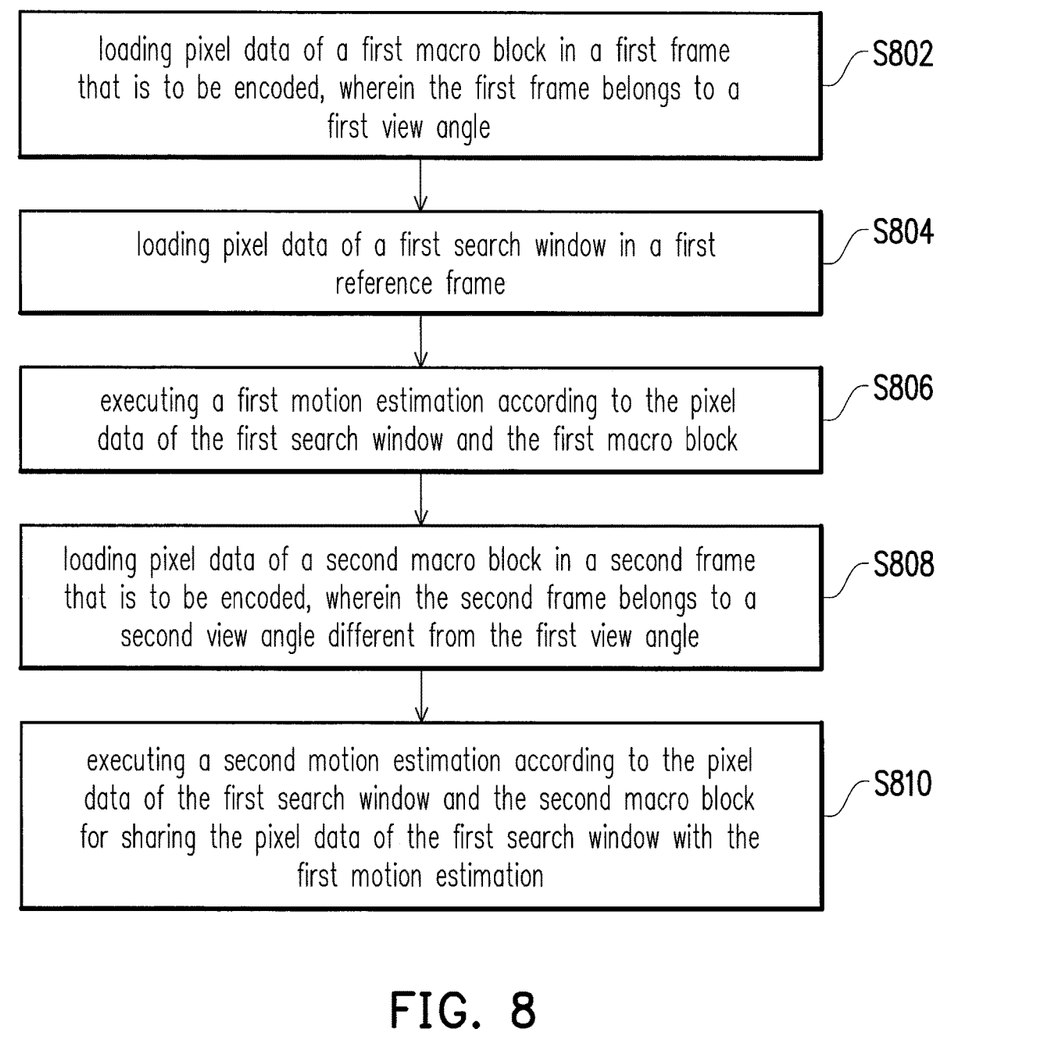
FIG. 8 is a flowchart illustrating an encoding method of a 3D video according to an embodiment of the invention.

FIG. 8 is a flowchart illustrating an encoding method of a 3D video according to an embodiment of the invention. The encoding method is for example applicable to the encoding device 100 of FIG. 1 but is not restricted to be used on the encoding device 100.

Referring to FIG. 8, in Step S802, the encoder 110 loads the pixel data of a first macro block in a first frame that is to be encoded, wherein the first frame belongs to a first view angle. In Step S804, the encoder 110 loads the pixel data of a first search window in a first reference frame from the memory 120. In Step S806, the encoder 110 executes a first motion estimation according to the pixel data of the first search window and the first macro block. In Step S808, the encoder 110 loads the pixel data of a second macro block in a second frame that is to be encoded from the memory 120, wherein the second frame belongs to a second view angle different from the first view angle. In Step S810, the encoder 110 executes a second motion estimation according to the pixel data of the first search window and the second macro block, so as to share the loaded pixel data of the first search window with the first motion estimation. Details of the steps of FIG. 8 have been explained in the above embodiments and thus are not repeated hereinafter.

Figure 9:
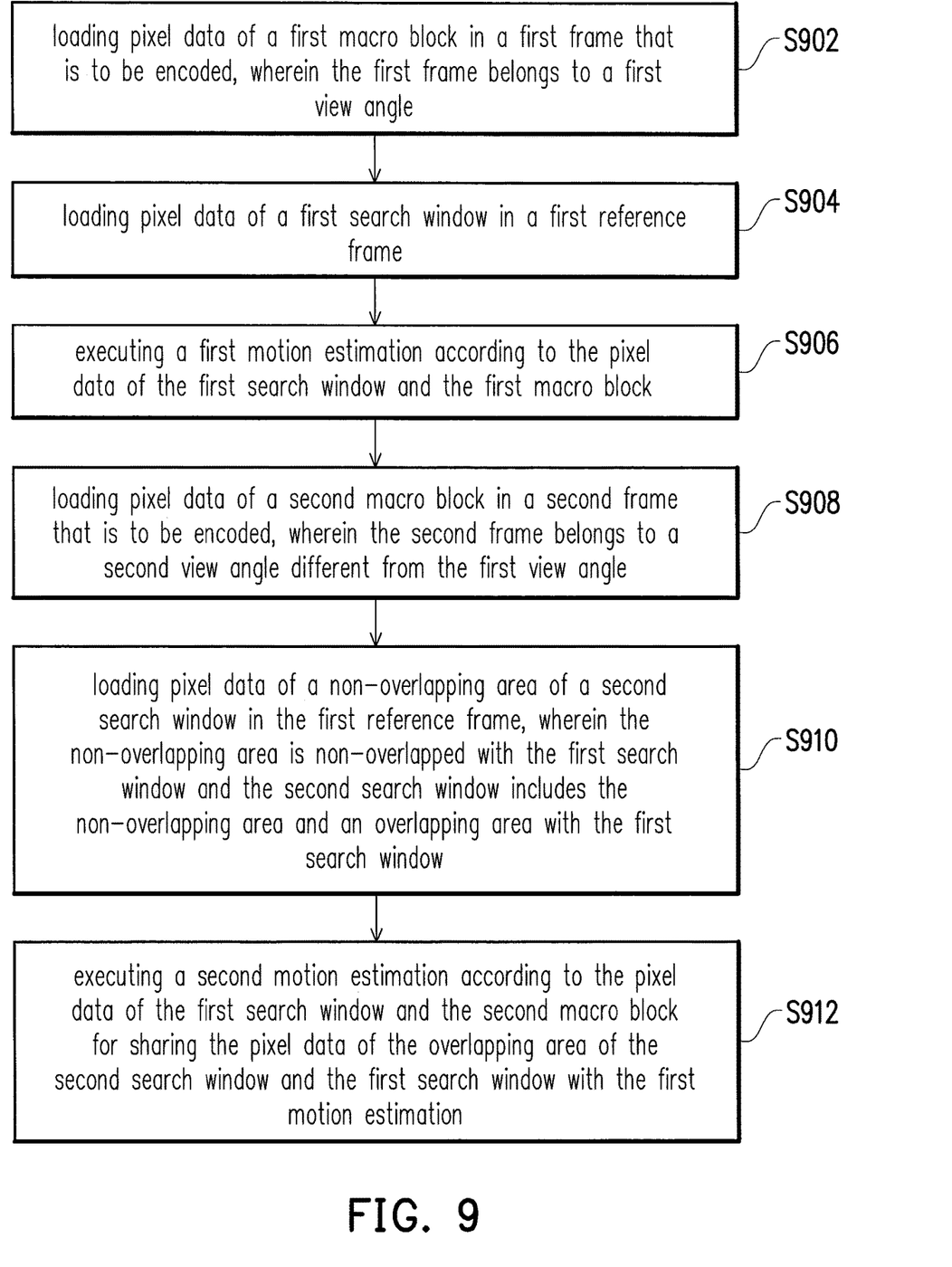
FIG. 9 is a flowchart illustrating an encoding method of a 3D video according to an embodiment of the invention.

FIG. 9 is a flowchart illustrating an encoding method of a 3D video according to an embodiment of the invention. The encoding method is for example applicable to the encoding device 100 of FIG. 1 but is not restricted to be used on the encoding device 100. A main difference between the embodiments of FIG. 8 and FIG. 9 lies in that the motion estimations do not share the pixel data of the same search window but share the pixel data of the overlapping area of different search windows.

Referring to FIG. 9, in Step S902, the pixel data of a first macro block in a first frame that is to be encoded is loaded, wherein the first frame belongs to a first view angle. In Step S904, the pixel data of a first search window in a first reference frame is loaded. In Step S906, a first motion estimation is executed according to the pixel data of the first search window and the first macro block. In Step S908, the pixel data of a second macro block in a second frame that is to be encoded is loaded, wherein the second frame belongs to a second view angle different from the first view angle. In Step S910, the pixel data of a non-overlapping area of a second search window in the first reference frame is loaded, wherein the non-overlapping area is non-overlapped with the first search window and the second search window includes the non-overlapping area and an overlapping area with the first search window. In Step S912, a second motion estimation is executed according to the pixel data of the second search window and the second macro block, thereby sharing the pixel data of the overlapping area of the first search window and the second search window with the first motion estimation. Details of the steps of FIG. 9 have been explained in the above embodiments and thus are not repeated hereinafter.

To conclude the above, the embodiments of the invention provide a video encoding method and an encoding device, which allow two or more than two motion estimations to share the pixel data of one search window or the pixel data of the overlapping area of different search windows by properly arranging the encoding or loading order of the macro blocks (defined by view angle number, frame number, and macro block number) in the frames that are to be encoded, thereby reducing the demand for memory bandwidth.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An encoding method for a 3D video for an encoding device, the encoding method comprising:
    loading pixel data of a first macro block in a first frame that is to be encoded, wherein the first frame belongs to a first sequence of frames with respect to a first view angle;
    loading pixel data of a first search window in a first reference frame;
    executing a first motion estimation according to the pixel data of the first search window and the first macro block;
    loading pixel data of a second macro block in a second frame that is to be encoded, wherein the second frame belongs to a second sequence of frames with respect to a second view angle different from the first view angle;
    executing a second motion estimation according to the pixel data of the first search window and the second macro block without loading the pixel data of the first search window again, by sharing the pixel data of the first search window which is previously loaded for executing the first motion estimation;
    loading pixel data of a second search window in a second reference frame, wherein one of the first motion estimation and the second motion estimation is executed according to the pixel data of the second search window;
    loading a third macro block in a third frame that is to be encoded, wherein the third frame belongs to a third sequence of frames with respect to a third view angle different from the first view angle and the second view angle; and
    executing a third motion estimation according to the pixel data of the second search window and the third macro block, by sharing the pixel data of the second search window previously loaded for executing one of the first motion estimation and the second motion estimation.

2. The encoding method according to claim 1, wherein a position of the first macro block in the first frame is consistent with a position of the second macro block in the second frame.

3. The encoding method according to claim 1, wherein the first reference frame belongs to one of the first view angle and the second view angle.

4. The encoding method according to claim 1, wherein one of the first frame and the second frame, which belongs to the same view angle as the first reference frame, is adjacent to the first reference frame.

5. The encoding method according to claim 1, wherein one of the first frame and the second frame, which belongs to the same view angle as the first reference frame, is separated from the first reference frame by at least one frame.

6. The encoding method according to claim 1, wherein after one of the first macro block and the second macro block is loaded, the other one of the first macro block and the second macro block is loaded sequentially.

7. The encoding method according to claim 1, wherein after one of the first motion estimation and the second motion estimation is executed, the other one of the first motion estimation and the second motion estimation is executed sequentially.

8. The encoding method according to claim 1, wherein the first motion estimation and the second motion estimation are executed simultaneously.

9. The encoding method according to claim 1, wherein the position of the first macro block in the first frame, the position of the second macro block in the second frame, and a position of the third macro block in the third frame are consistent with each other.

10. The encoding method according to claim 1, wherein the first reference frame belongs to one of the first view angle, the second view angle, and the third view angle; and the second reference frame belongs to another one of the first view angle, the second view angle, and the third view angle.

11. The encoding method according to claim 1, wherein after one of the first, second, and third macro blocks is loaded, another one of the first, second, and third macro blocks is loaded sequentially; and after the another one of the first, second, and third macro blocks is loaded, the last one of the first, second, and third macro blocks is loaded sequentially.

12. The encoding method according to claim 1, further comprising: loading pixel data of a third search window in a third reference frame, wherein the other one of the first motion estimation and the second motion estimation is executed according to the pixel data of the third search window.

13. The encoding method according to claim 12, wherein the first reference frame and the second reference frame belong to one of the first view angle and the second view angle; and the third reference frame belongs to the other one of the first view angle and the second view angle.

14. An encoding device, comprising:
a memory; and
an encoder coupled to the memory and loading pixel data of a first macro block in a first frame that is to be encoded from the memory, wherein the first frame belongs to a first sequence of frames with respect to a first view angle,
wherein the encoder loads pixel data of a first search window in a first reference frame from the memory, executes a first motion estimation according to the pixel data of the first search window and the first macro block, loads pixel data of a second macro block in a second frame that is to be encoded, and the second frame belongs to a second sequence frames with respect to a second view angle different from the first view angle;
wherein the encoder executes a second motion estimation according to the pixel data of the first search window and the second macro block without loading the pixel data of the first search window again, by sharing the pixel data of the first search window which is previously loaded for executing the first motion estimation,
wherein the encoder is further configured to:
load pixel data of a second search window in a second reference frame, wherein one of the first motion estimation and the second motion estimation is executed according to the pixel data of the second search window;
load a third macro block in a third frame that is to be encoded, wherein the third frame belongs to a third sequence of frames with respect to a third view angle different from the first view angle and the second view angle; and
execute a third motion estimation according to the pixel data of the second search window and the third macro block, by sharing the pixel data of the second search window previously loaded for executing one of the first motion estimation and the second motion estimation.

15. The encoding device according to claim 14, wherein a position of the first macro block in the first frame is consistent with a position of the second macro block in the second frame.

16. The encoding device according to claim 14, wherein the first reference frame belongs to one of the first view angle and the second view angle.

17. An encoding method for a 3D video, adapted for an encoding device, the encoding method comprising:
loading pixel data of a first macro block in a first frame that is to be encoded, wherein the first frame belongs to a first sequence of frames with respect to a first view angle;
loading pixel data of a first search window in a first reference frame, wherein the first search window comprises a first non-overlapping area and a first overlapping area;
executing a first motion estimation according to the pixel data of the first search window and the first macro block;
loading pixel data of a second macro block in a second frame that is to be encoded, wherein the second frame belongs to a second sequence of frames with respect to a second view angle different from the first view angle;
loading pixel data of a second non-overlapping area of a second search window in the first reference frame, wherein the second search window comprises the second non-overlapping area which does not overlap with the first search window and a second overlapping area which overlaps with the first overlapping area of the first search window;
executing a second motion estimation according to the pixel data of the second search window and the second macro block without loading the pixel data of the second overlapping area again, by sharing the pixel data of the first overlapping area of the first search window which is previously loaded for executing the first motion estimation;
loading pixel data of a second search window in a second reference frame, wherein one of the first motion estimation and the second motion estimation is executed according to the pixel data of the second search window;
loading a third macro block in a third frame that is to be encoded, wherein the third frame belongs to a third sequence of frames with respect to a third view angle different from the first view angle and the second view angle; and
executing a third motion estimation according to the pixel data of the second search window and the third macro block, by sharing the pixel data of the second search window previously loaded for executing one of the first motion estimation and the second motion estimation.

* * * * *